June 2, 1931.  R. W. GRACE  1,808,545

TEST CLIP

Filed July 18, 1928

Inventor
R. W. Grace
By Harry Frease
Attorney

Patented June 2, 1931

1,808,545

UNITED STATES PATENT OFFICE

RICHARD W. GRACE, OF CANTON, OHIO, ASSIGNOR TO THE SUPERIOR SWITCHBOARD & DEVICES COMPANY, OF CANTON, OHIO, A CORPORATION OF OHIO

TEST CLIP

Application filed July 18, 1928. Serial No. 293,547.

The invention relates to test clips for electrically connecting a test meter to the ears of a switch or the like in order to test an electric meter such as is ordinarily associated with the entrance box to a dwelling house or other building.

The form of test clips now in general use comprises a pair of pivoted clamping jaws adapted to be spring pressed into clamping position upon the usual test ear, and for this purpose the ears are ordinarily corrugated to assist in holding the clamping jaws of the test clip thereon.

Such test clips, however, are not provided with any positive locking means for holding them in position and furthermore, it has been found by experience that such test clips frequently become engaged with two adjacent test ears, thus forming a short circuit.

The object of the present improvement is to provide a test clip which will be positively locked in position upon the test ear, preventing accidental movement or displacement thereof and which cannot possibly engage more than one test ear at a time, thus overcoming the principal objections to the ordinary form of test clip.

Figure 1:
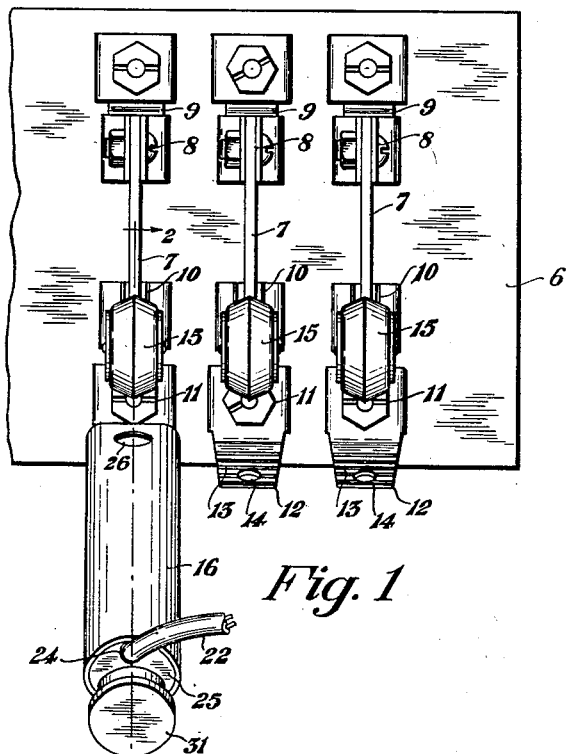
Figure 3:
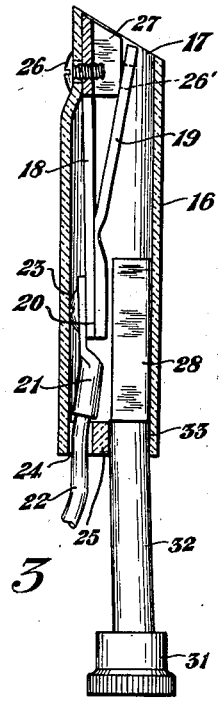
Figure 4:
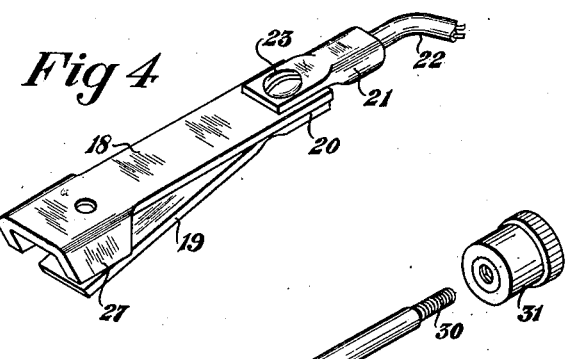
Figures 2, 5:
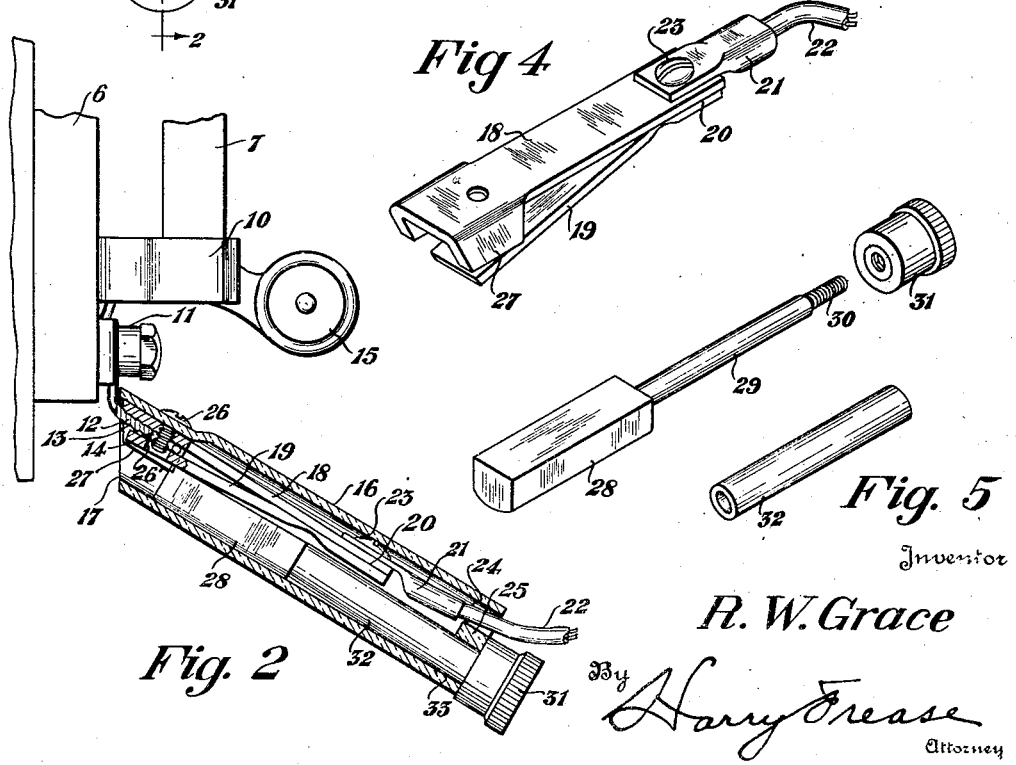

An embodiment of the invention is illustrated in the accompanying drawings, in which Figure 1 is an elevation of a portion of a test switch showing the improved test clip mounted in position thereon;

Fig. 2, a section taken substantially on the line 2—2, Fig. 1;

Fig. 3, a longitudinal sectional view through the test clip showing the same in the unlocked or inoperative position;

Fig. 4, a detail perspective view of the spring clamping jaws; and

Fig. 5, a detached perspective view of the several parts of the operating plunger.

Similar numerals refer to similar parts throughout the drawings.

The switch may be of any usual and well known construction mounted upon an insulation block 6 and having one or more switch blades 7 hingedly connected as at 8 to a terminal 9 and adapted to engage the spring contact jaws 10 of a terminal 11.

A test ear 12 may be fixed upon each of the terminals 11 and is preferably tapered toward its outer end as shown and may be corrugated as indicated at 13 if desired. Each of these test ears is provided with an aperture 14 for a purpose to be hereinafter explained. Each blade may be provided with the customary knob 15, at its free end, by means of which the switch may be manually operated.

The test clip, to which the invention pertains, may be enclosed in a tubular casing 16 formed of suitable insulation material and beveled at its outer end as indicated at 17. The clamping jaws of the clip comprise the fixed jaw 18 and the movable spring jaw 19 which may be fixed together at their inner ends, as by welding or the like as indicated at 20.

The terminal clip 21, attached to the conductor 22, which leads to the test meter, may be connected to the attached ends of the clamping jaws as by a screw 23, the conductor extending through an opening 24 in the closed end 25 of the tubular casing.

The jaw 18 is connected, near its outer end, to the tubular casing 16 as by the screw 26 which protrudes through the jaw 18 for a considerable distance and is adapted to receive the aperture 26' in the free end portion of the jaw 19.

Ears 27 are formed upon the outer end portion of the jaw 18 between which the free end portion of the jaw 19 is adapted to be received when in the clamping position as shown in Fig. 2.

For the purpose of operating the clamping jaws a plunger 28 is slidably mounted within the tubular casing. This plunger is provided with a shank 29 having a screw threaded end 30 upon which the button 31 is attached and is adapted to be covered as by the insulation tube 32 slidably located through the opening 33 in the closed end portion of the tubular casing.

In attaching the test clip to the test ear 13 the ear is received within the tubular casing and the screw 26 is engaged with the aperture 14 of the ear. The plunger is then depressed, contacting with the spring clamping jaw 19 and moving the same toward the fixed clamping jaw 18, the free end portion of the jaw 19 being received between the ears 27, between which the test ear 13 is located.

The jaw 19 will be tightly clamped against the test ear, gripping the same between the jaws 18 and 19 and the end of the screw 26 will be received in the aperture 26' of the jaw 19, thus locking the clip in position upon the test ear.

With this construction it will be seen that the test clip, when clamped in position upon the test ear, cannot be accidentally displaced from the ear. It will also be obvious that the test clip cannot be engaged with more than one test ear at a time since the test ear is received between the ears 27 of the test clip, thus holding the clip against any lateral movement with relation to the test ear.

I claim:

1. A test clip including a tubular casing, a pair of normally open clamping jaws within one end portion of the casing for receiving a test ear, and a manually operable plunger slidable within the casing and protruding from the other end thereof and engaging the casing and one of the jaws for clamping them upon a test ear.

2. A test clip adapted to be clamped upon a test ear having an aperture therein, said clip including a tubular casing, a pair of clamping jaws within one end portion of the casing for receiving the test ear, one of the jaws having a stud receivable in the aperture of the test ear, and a manually operable plunger slidably mounted through the other end of the casing and engaging the interior wall of the casing and one of the jaws for clamping them upon the test ear.

3. A test clip adapted to be clamped upon a test ear having an aperture therein, said clip including a tubular casing, a pair of clamping jaws within one end portion of the casing for receiving the test ear, one of the jaws having a stud receivable in the aperture of the test ear, the other jaw having an aperture for receiving said stud and a manually operable plunger slidably mounted through the other end of the casing and engaging the interior wall of the casing and one of the jaws for clamping the jaws upon the ear.

In testimony that I claim the above, I have hereunto subscribed my name.

RICHARD W. GRACE.